Aug. 2, 1949.  J. COLLARD  2,478,007
APPARATUS FOR MEASURING VOLTAGES OR ELECTRIC FIELD
INTENSITIES IN HIGH-FREQUENCY ELECTRICAL
TRANSMISSION LINES AND WAVE GUIDES
Filed Feb. 7, 1944
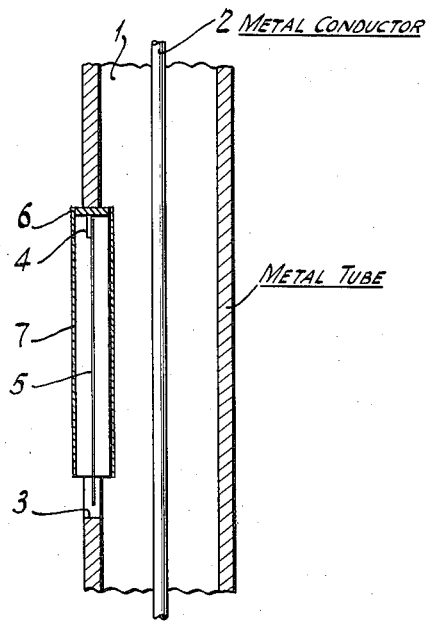
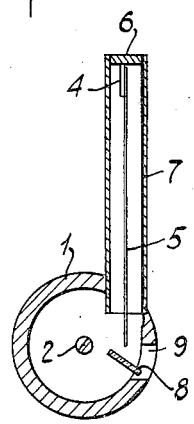 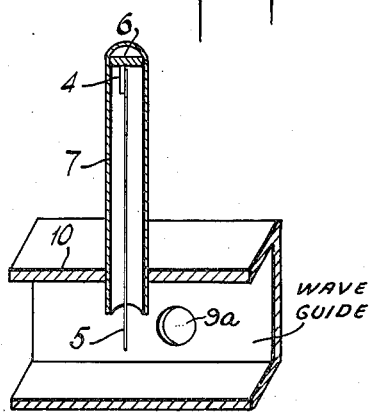
INVENTOR
JOHN COLLARD.
BY
ATTORNEY Patented Aug. 2, 1949

2,478,007

UNITED STATES PATENT OFFICE 2,478,007

APPARATUS FOR MEASURING VOLTAGES OR ELECTRIC FIELD INTENSITIES IN HIGH-FREQUENCY ELECTRICAL TRANSMISSION LINES AND WAVE GUIDES

John Collard, Hammersmith, London, England, assignor to Electric & Musical Industries Limited, Hayes, Middlesex, England, a company of Great Britain Application February 7, 1944, Serial No. 521,370
In Great Britain September 5, 1942

Section 1, Public Law 690, August 8, 1946
Patent expires September 5, 1962

12 Claims. (Cl. 171—95)

The present invention relates to apparatus for measuring voltages or electric field intensities in high frequency electrical transmission lines and wave guides.

In the specification of U. S. patent application Serial No. 486,518 filed May 10, 1943, now Patent #2,395,851, issued March 5, 1946, apparatus for measuring voltages in high frequency electrical transmission lines is described in which the deflection of a leaf of electrically conducting material, such as gold, attached to one conductor of a transmission line serves to afford the required voltage indication. In such apparatus, in order that errors may be avoided, the electrical length of the leaf must be made short in comparison with the wavelength at the frequency to be measured. Thus, with a metal leaf mounted in the normal manner the actual length of the leaf is restricted especially at high frequencies. However, for good deflection sensitivity the actual length of the leaf should be long.

The object of the present invention is to provide apparatus for measuring voltages or electric field intensities in high frequency electrical transmission lines and wave guides in which an indication of the voltage or field intensity is provided by the deflection of an electrically conducting leaf and in which a good deflection sensitivity is obtained, while the electrical length of the leaf is effectively short.

According to the main feature of the present invention, apparatus for measuring voltages in a high frequency electrical transmission line or wave guide is provided comprising a metal leaf of electrically conducting material mounted at a point in a section of the transmission line or wave guide for affording an indication of the strength of the electric field at that point, said leaf being included in a screen or shield and attached to one of the conductors of the line or to the wall of the guide in such manner that the effective electrical length of said leaf in respect of a high frequency wave traveling in the transmission line or guide is less than that corresponding to the actual length of the leaf.

In the preferred forms of the invention the aforesaid screen cooperates with said leaf to provide a section of transmission line, said screen being of such a length that the leaf is electrically equivalent to a leaf having a length equal to that of the portion extending outside said screen.

A feature of the invention is the provision of apparatus for measuring high frequency electric field intensities within a conductive enclosure for said electric field comprising a leaf of electrically conducting material mounted in an aperture in a wall of said enclosure in such position as to be deflected when an electromagnetic field exists within said enclosure, the deflection of said leaf affording an indication of the electric field intensity.

In order that the present invention may be clearly understood and readily carried into effect, the same will now be described with reference by way of example to the accompanying drawing, of which:

Figs. 1 and 2 are diagrammatic representations of two methods of mounting a conducting leaf arranged in accordance with the invention on a transmission line of the coaxial conductor type, and Fig. 3 is a diagrammatic representation of the method of mounting a conducting leaf arranged in accordance with the invention on a rectangular wave guide.

In all the figures of the drawing like parts are indicated by the same reference numerals.

In the example shown in Fig. 1 of the drawing the transmission line comprises outer and inner conductors 1 and 2 respectively, arranged to extend vertically, the outer conductor 1 being shown in section. The conductor 1 is slotted as indicated at 3 and supported from one end of the slot at 4 is a conducting leaf 5 preferably of gold, the leaf 5 being attached to a piston 6 which forms a closure for one end of a tubular screen 7, also shown in section, from the other end of which the leaf 5 projects, the leaf 5 and the screen 7 together constituting a short section of coaxial transmission line short-circuited at one end by the piston 6. The length of the screen 7 is made equal to a half wavelength at the operating frequency so as to constitute with the leaf 5 a half wavelength section short-circuited at one end by the piston 6. Thus the portion of the leaf 5 within the screen itself presents a very low impedance as seen from the part of the leaf 5 projecting from the screen, the arrangement acting electrically as through the leaf 5 had a length equal to that of the projecting part of the leaf and was attached to the conductor 1 at the open end of the screen. Thus as regards high frequency currents, the only part of the leaf 5 to be considered is the part projecting from the screen 7. This part of the leaf 5 can be made quite short. However, as regards deflection sensitivity, the amount of displacement of the end of the leaf 5 will depend on the physical length thereof and not on the effective electrical length and the deflection sensitivity of the leaf will be good.

If the upper end of the screen 7 is short-circuited, as above described, the length of the screen can be made equal to any whole number of half wavelengths. Alternatively, however. the leaf 5 can be electrically insulated from the screen 7 at the top, in which case the length of the screen should be made equal to an odd integral number of quarter wavelengths. In a particular case of apparatus for measuring voltages at a frequency corresponding to a wavelength of 3.2 cm., a sleeve 7 having a length of 1.6 cm. and a diameter of 2 mms. was employed, the conductor 1 of the transmission line having an internal diameter of 7 mms. and the inner conductor 2 a diameter of 2 mms.

If the leaf 5 is insulated from the screen for high frequency operation, it must be connected thereto when a D. C. or low frequency calibration is carried out, the method of effecting such calibration being described in the specification of U. S. application Serial No. 486,418 filed May 10, 1943.

In the arrangement of Fig. 1 the deflection of the leaf 5 is preferably observed through a microscope arranged, for example, in the manner described in the specification of U. S. application No. 486,418 and shown in the drawings thereof.

In the arrangement of Fig. 1 it will be seen that a large part of the screen 7 is included between the conductors 1 and 2 of the transmission line and the field between the conductors is consequently somewhat disturbed due to the introduction of the screen 7. To overcome this difficulty the arrangement indicated in Fig. 2 may be adopted, in which the conductors 1 and 2 are arranged to extend horizontally, and the screen 7 is mounted on the outer conductor 1 of the line so that its axis is vertical, the open end of the screen extending through the conductor 1.

In this case a much smaller part of the screen 7 lies within the conductor 1 than is the case with the arrangement of Fig. 1.

The deflection of the leaf 5 in the arrangement of Fig. 2 can be observed through a suitable microscope focused on the end of the leaf, for example, a mirror may be positioned as indicated at 8, and the end of the leaf viewed through a microscope looking into this mirror through the aperture 9 in conductor 1. The leaf can also be illuminated through aperture 9.

In accordance with a feature of the invention, a conducting leaf, such as the leaf 5 of Figs. 1 and 2, is employed for indicating the intensity of the electric field within a wave guide to afford an indication of the voltage transmitted through the guide. In this case the leaf should be suspended so as to be as nearly as possible at right angles to the lines of electric force. Thus in a cylindrical guide operated in the E₀ mode so that the lines of electric force extend radially of the guide, the arrangement of Fig. 1 or 2 could be adopted, there being no inner conductor in the guide, however. With these arrangements the provision of the screen 7 cooperating with the leaf 5 again increases the deflection sensitivity of the arrangement.

In the case of a wave guide of rectangular form operated in the simplest mode, the leaf 5 and its screen 7 may be mounted on one wall of the guide in the manner indicated in Fig. 3 of the drawing, the plane of the leaf being parallel to the direction of propagation of waves along the guide and its length at right angles to the lines of electric force. In Fig. 3 the wall of the guide is indicated at 10 and the screen 7 and the leaf 5 are arranged so that the leaf 5 projects far enough into the field to be adequately deflected without the arrangement producing undue interference with the field within the guide. The deflection of the leaf, in the arrangement of Fig. 3, can be observed through a microscope focused on the end of the leaf, the leaf being viewed through a suitable aperture 9a in the wall of the guide.

What I claim is:

1. A device for measuring feeble high frequency field intensities in a wave guide comprising a thin metallic member, a shield secured to said wave guide and having an opening therein, a thin metallic member having a greater length than said shield, said thin metallic member secured at one end of the opening in said shield, and means to determine the movement of said thin metallic member with respect to said shield.

2. A device for measuring feeble high frequency field intensities in a wave guide comprising a thin metallic member, a shield secured to said wave guide and having a length equal to one half the wavelength at the operating frequency and an opening therein, a thin metallic member having a greater length than said shield, said thin metallic member having an effective length with respect to a high frequency wave traveling in said wave guide which is less than its actual length, said thin metallic member being secured at one end of the opening in said shield, and means to determine the movement of said thin metallic member with respect to said shield.

3. A device for measuring feeble high frequency field intensities in a transmission line including a tubular conductive member having a longitudinal slot therein, an inner conductor concentrically located within said member, a thin tubular member having a length equal to one-half wave length at the operating frequency and secured to a portion of said slot so as to constitute a metallic shield, a leaf of thin conducting material secured to one end of said shield and having a length which is slightly greater than said shield so as to project beyond the shield and within the slot of said first-mentioned tubular member, and means to determine the movement of said leaf with respect to said shield.

4. Apparatus for measuring voltages within a hollow conductive enclosure for ultra high frequency wave energy including a leaf of electrically conductive foil in an aperture in a wall of said enclosure, a shield member covering said aperture, said shield member being in the form of a conductive tube a half wave in length at the operating frequency and closed at one end of said shield member and having its open end in said aperture, said leaf secured at one end to the closed end of said shield member and extending from the open end of said shield within said enclosure.

5. Apparatus for measuring voltages within a hollow conductive wave guide enclosure for ultra high frequency wave energy including a leaf of electrically conductive foil in an aperture in a wall of said enclosure, a shield member secured to said enclosure and covering said aperture, said shield member being in the form of a conductive tube a half wave in length at the operating frequency and closed at one end of said shield member and having its open end in said aperture, said leaf extending from the open end of said shield within said enclosure, said leaf being secured at one end to the closure at the closed end of said shield member and having its free end extend slightly beyond the open end of said shield member, the plane of said leaf being parallel to the direction of propagation of energy within said enclosure and its length at right angles to the line of electric force therein.

6. Apparatus for measuring voltages within a hollow conductive enclosure for ultra high frequency wave energy including a section of coaxial transmission line having an outer shield member having a length equal to one half of a wavelength of said wave energy and an inner conductor member, said members being connected together at one end, said shield member being connected to said enclosure and covering an aperture in said enclosure, said inner conductor member being in the form of a thin conductive foil extending within said enclosure.

7. Apparatus for measuring voltages within a hollow conductive wave guide enclosure for ultra high frequency wave energy including a section of coaxial transmission line having an outer shield member having a length equal to one half of a wavelength of said wave energy and an inner conductor member, said members being connected together at one end, said shield member being connected to said enclosure and covering an aperture in said enclosure, said inner conductor member being in the form of a thin conductive foil extending within said enclosure, the plane of said foil being parallel to the direction of propagation of energy within said enclosure and its length at right angles to the line of electric force therein.

8. Apparatus for measuring voltages within a hollow conductive wave guide enclosure for ultra high frequency electro-magnetic fields including a tubular metallic member closed at one end and open at the other end, a leaf of electrically conductive foil secured at one end to said closed end of said tubular metallic member and free at its other end, said hollow conductive enclosure having an aperture therein, said leaf having a length slightly greater than one half of the wavelength at the frequency of said field, said free end being close to that end of said aperture which is remote from the end to which the leaf is secured and extending through said aperture to be deflected by said fields without producing undue interference.

9. Apparatus for measuring voltages in a high frequency transmission line comprising a metallic wave guide, in the form of a tubular metallic member, said shield having an open and a closed end, said shield being located outside the wave guide and extending at its open end within an aperture therein, a leaf of electrically conducting material mounted in the closed end of said metallic shield and having its free end extending beyond the open end through the aperture in said wave guide at a point affording an indication of the strength of the electric field at that point adjacent the free end of said leaf, the effective electrical length of said leaf in respect of a high frequency wave traveling in the wave guide being less than that corresponding to the actual length of said leaf.

10. Apparatus according to claim 9 wherein the shield has its length dimensions relative to the leaf dimensions such as to provide a section of a transmission line, said shield having a length dimension such that its length is electrically equivalent to a leaf having a length equal to that of the free length portion extending beyond the outside of said shield.

11. Apparatus for measuring high frequency electric field intensities in a wave guide having an aperture, a tubular shield closed at one end and open at the other end and located in the aperture of said wave guide, a leaf of electrically conducting material mounted within said tubular shield at the closed end and extending slightly beyond the outside of said guide in such a position as to be deflected when waves are flowing in said wave guide, the deflection of said leaf affording an indication of the electric field intensity.

12. Apparatus for measuring the high frequency electric field intensity in the neighborhood of an electrical conductor comprising a leaf of electrically conducting material partly enclosed with a conducting screen, the leaf and screen being so arranged and associated with said conductor that the effective length of the leaf is less than the physical length of the leaf the arrangement being such that the leaf is deflected when said field exists in the neighborhod of said conductor to an extent depending on the intensity of the field in the region of said leaf.

JOHN COLLARD.

REFERENCES CITED

The following references are of record in the file of this patent:

UNITED STATES PATENTS

| Number | Name | Date |
|---|---|---|
| 1,059,095 | Whitehead | Apr. 15, 1913 |
| 1,705,480 | Scott-Huntington | Mar. 19, 1929 |
| 1,893,671 | Hentschel | Jan. 10, 1933 |
| 2,106,713 | Bowen | Feb. 1, 1938 |
| 2,191,271 | Carter | Feb. 20, 1940 |
| 2,395,851 | Cork | Mar. 5, 1946 |

FOREIGN PATENTS

| Number | Country | Date |
|---|---|---|
| 111,801 | Austria | Dec. 27, 1928 |
| 548,681 | Great Britain | Oct. 20, 1942 |